Nov. 30, 1937.  C. EMMEY  2,100,712
METHOD OF, APPARATUS FOR COATING TEXTILE MATERIAL AND A PRODUCT THEREOF
Filed April 13, 1936
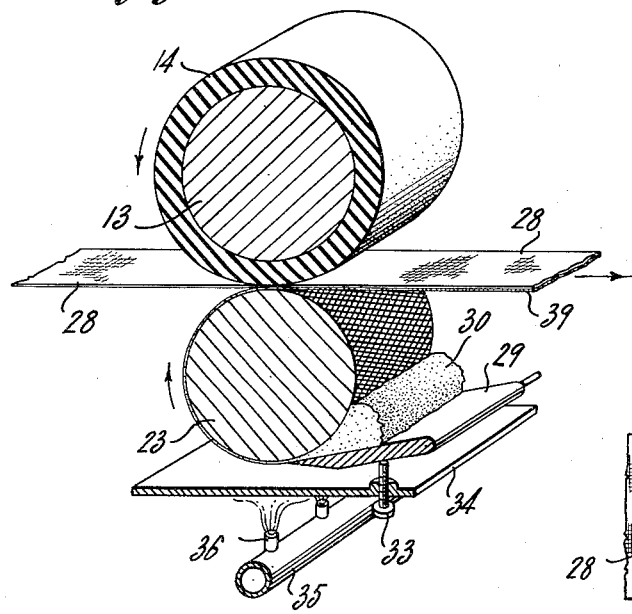
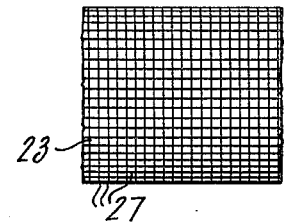
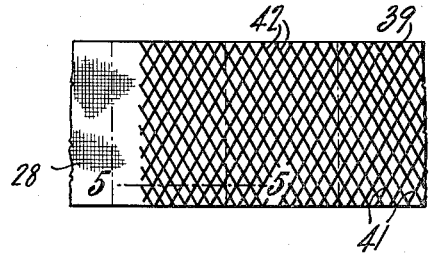
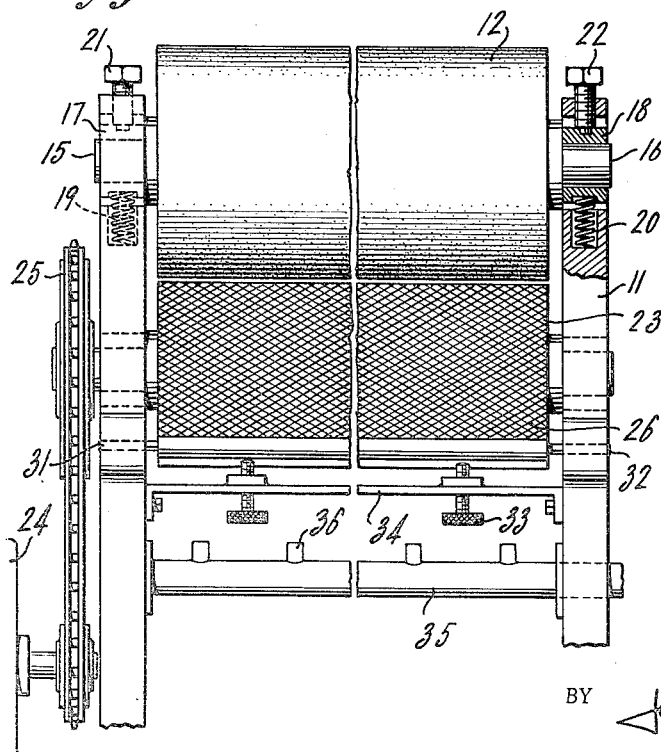
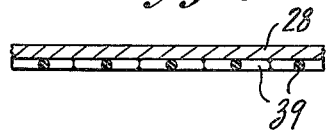
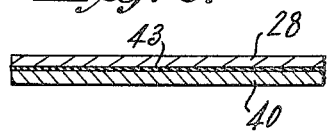
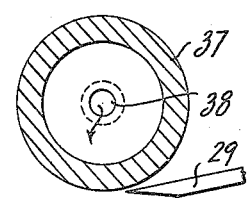
INVENTOR.
CHARLES EMMEY
BY Joseph F. Padlon
His ATTORNEY.

Patented Nov. 30, 1937

2,100,712

UNITED STATES PATENT OFFICE 2,100,712

METHOD OF, APPARATUS FOR COATING TEXTILE MATERIAL AND A PRODUCT THEREOF

Charles Emmey, New York, N. Y.

Application April 13, 1936, Serial No. 74,178

6 Claims. (Cl. 91—70)

This invention relates to a method of and apparatus for coating textile material and the like. More particularly it relates to a method of applying a reticulated cementitious, adhesive material to one surface of a textile fabric; to apparatus for applying said adhesive material; to a composition for applying the same and to a product thereof.

Fabrics, textiles, and other materials, adapted for adhesion on to other surfaces as presently used, have a coating or film on one surface which is applied in solution and dried thereon. After application, the whole film is warmed and forms an intermediate joining layer with the wearing apparel. Such films on application do not permit easy spreading on the back of the fabric and require large amounts of adhesive material for the same. Furthermore, the film or cementitious composition when applied to a fabric, does not adhere very firmly since some of the solvents of the cementitious composition, is not fully driven off and as such permit peeling of the same.

In view of the foregoing disadvantages it is one of the objects of the present invention to provide effective, simply constructed apparatus for making a reticulated cementitious material and applying the same to one surface of textile fabrics or other receptive material, while in a solid or plastic condition.

It is another object of the present invention to make a reticulated cementitious material of any desired geometrical outline and of applying the same to a receptive surface for subsequent application, to wearing apparel and the like.

One further object of the present invention is to provide a mixture of cementitious adhesive material in the absence of solvents, and forming a geometric reticulated mass adapted to combine firmly with and adhere to a receptive surface.

Still another object of the present invention is to provide a reticulated web cementitious material having a geometric interlocking formation adapted upon application to a receptive surface to firmly adhere to the surface, at the geometric lines of formation and at the interlocking portions thereof.

Another object of the present invention is to make a fabric or other applique material having on one or more of its surfaces a reticulated geometrically formed weblike cementitious material for bonding the applique to some other receptive surface.

Still another object of the invention is to provide a method of applying an adhesive fusible bonding agent in the absence of solvents, onto a receptive surface and form a reticulated coating of geometric design and appearance thereon.

Other objects and advantages will be apparent from the following detailed description taken in connection with the accompanying drawing.

In the drawing:

Fig. 1 is a fragmental perspective view of the apparatus and illustrating a process embodying the present invention.

Fig. 2 is a fragmental elevation of the apparatus embodying the present invention.

Fig. 3 is a fragmental side elevation of a modified element taken from the apparatus shown in Fig. 2.

Fig. 4 is a plan view of coating onto a textile in accordance with the present invention.

Fig. 5 is an end view taken on line 5—5 in Fig. 4.

Fig. 6 is an end view of the article shown in Fig. 4, after application and adhesion to a receptive material, and Fig. 7 is a modification of one of the elements shown in Fig. 2.

In the drawing similar reference numerals relate to like parts thruout.

Referring to the accompanying drawing, a pair of opposed, vertically disposed supporting frame members 10 and 11, shown partly broken away in Fig. 2 are adapted to be mounted on any suitable floor base or frame work. Journalled onto frame members 10 and 11 is a rotary cylinder 12 made preferably of any suitable material such as iron 13 and having a periphery of resilient material, such as rubber 14. It is to be noted that such cylinder may be of any desired diameter and may have any desired resiliency. Said cylinder is mounted on and is supported at its ends 15 and 16 in bushings 17 and 18 respectively, on frame members 10 and 11.

Bushings 17 and 18 are mounted on spring members 19 and 20 in the respective frame members, and are retained in fixed position by means of adjustable screws 21 and 22 fitting into the tops of frame members shown in Fig. 2.

Also mounted in the frame members 10 and 11, is a non-resilient rotary cylinder 23. Said cylinder is disposed coaxially parallel with cylinder 12 and is driven by any suitable means, such as a motor 24 in connection therewith such as by a chain drive 25. It is to be noted that cylinder 23 is provided on its peripheral surface with grooves 26 imparting in this particular instance a diamond shaped printed appearance to the cylinder surface. Such grooves, as shown, have a depth from the surface adapted to act as receptive carrying recesses for fusible material as will be hereinafter described. It is to be noted that such surface of rotary cylinder 23, may have any geometric shaped grooves, for example, circular, triangular elliptical and the like. Another example of the type of geometrical recesses in cylinder 23 is shown in Fig. 3 in which are shown rectangular grooves. The recesses or grooves are of sufficient depth to permit cementitious material to become imbedded therein. The cylinder as described may be of steel or other rigid material and is preferably hollow.

Cylinders 12 and 23 as shown in Fig. 2, may be brought into close peripheral contact by means of adjusting screw members 21 and 22, whereby pressure is exerted against cylinder 23 during the coating process hereinafter described. Said cylinders may be so spaced as to permit a textile strip or cloth 28 to pass therebetween as shown in Fig. 1. The strip is forced thru between said cylinders 14 and 23 upon actuation of the lower cylinder 23, by drive 25.

Pivotally mounted on the frame members 10 and 11, is an adjustable spreading knife 29 for carrying a thermoplastic fusible cementitious material 30 against cylinder 23. Spreading knife 29 being retained by means of pivots 31 and 32 in frame members 10 and 11 respectively may be raised or lowered by a plurality of equispaced adjustable setscrews 33 extending from a base or hotplate 34. Said hotplate is fixed to the frame members and is heated by means of a gas burner 35 also mounted on the frame members. The heat of the burning gas from jets 36 is evenly distributed over the hotplate in order to render material 30 relatively plastic for filling in only the grooves of cylinder 23, and at the same time prevent the material from being charred. The flame from jets 36 may be regulated in any well known manner.

Instead of using the gas heating arrangement above described and shown in Fig. 2, there is provided a modified type of cylinder 37 having a coaxial central tube 38, thru which steam is passed, thereby keeping the cylinder sufficiently hot to render the material plastic for working.

In the operation of the preferred apparatus described hereinabove, cylinders 14 and 23 are relatively adjusted to form a frictional contact with textile strip 28 which is passed between them. As the composition material 30 hereinafter described is rendered fusible, it is forced into grooves 26 by means of spreader 29. Said material in the grooves is carried during the rotation of cylinder 23 against the undersurface of strip 28 and adheres thereto when the strip is brought into frictional contact with pressure cylinder 12. Sufficient pressure is exerted by said cylinder on the strip during the operation to take up the material which becomes flexibly rigid thereon, having a reticulated geometric formation 39 as shown in Fig. 4. It is to be noted that the textile material may be of any desired width for receiving the reticulated layer of cementitious fusible material.

Said textile material once coated as above described may be cut into desired strips or sizes ready for use by laying over a surface of any suitable material 40 such as silk, cotton, wool, fabrics, celanese, rayon and the like. In order to form a permanent union therewith, heat and pressure are applied whereby the reticulated geometrical formation of cementitious material particularly at the interlocking portions 41, as shown in Fig. 4 penetrate the fabric forming anchorage points while the extending portions 42 form lines of adhesion. There is also a slight spreading with the penetration of the cementitious material 30 forming a highly adhesive film between the textile materials thereby strongly uniting them.

As examples of the composition used in connection with the coating of textiles and like materials and which form a part of the present invention, the following formulas are given.

Example 1

| | Parts |
|---|---|
| Vinyl acetate resin | 75 |
| Glyceryl phthalate | 25 |
| Diphenyl benzyl benzoate | 2 |

Example 2

| | Parts |
|---|---|
| Vinyl acetate resin | 65 |
| Glyceryl phthalate | 35 |
| Diphenyl benzyl benzoate | 2 |

Example 3

| | Parts |
|---|---|
| Vinyl acetate resin | 85 |
| Bakelite XR 254 (phenolic condensation resin) | 15 |
| Castor oil base | 3 |

Example 4

| | Parts |
|---|---|
| Chlorinated rubber | 5 |
| Vinyl acetate resin | 80 |
| Glyceryl phthalate | 15 |
| Dibutyl phthalate | 3 |

Example 5

| | Parts |
|---|---|
| Vinyl actate resin | 85 |
| Resin | 5 |
| Cumar | 5 |
| Castor oil | 5 |
| Chlorinated rubber | 3 |

All parts given above are by weight and are mixed together by melting and agitating. Guttapercha, latex, crepe or sheet rubber may be substituted for the rubber compound given above.

In Example 5 damar, elemi, and ester resins may be substituted for the rosin or cumar gum.

It is to be noted from the above examples that the composition comprises one or more resins, an oil and a vinyl derivative forming a paste upon application of heat and which upon cooling forms a homogeneous mass. It is to be understood, however, that I do not limit myself to the mass disclosed herein as an example, but may use any thermoplastic composition which in conjunction with my apparatus herein disclosed, will have a reticulated geometric appearance.

From the above description taken in connection with the accompanying drawing, it will be noted that the invention in its preferred embodiment includes apparatus for making reticulated masses of fusible material having a geometric design which while plastic is cementitious and is applied onto a receptive surface. Said masses are applied onto any desired materials, such as textiles, fabrics, paper, asbestos, leather and its substitutes and like materials.

By such apparatus, the fusible material is made plastic and applied as such thereby eliminating the use of solvents which require evaporation from the mass. Furthermore, by the apparatus herein described, the reticulated mass of cementitious material is flexible and yet sufficiently rigid so as not to crack or break upon bending.

It also can be made of any desired geometrical design, and applied onto any desired width onto textiles and like materials, and has the property of cementing fabrics and like materials together.

In the method of application, the reticulated layer is picked up by the textile as it is forced thru between the cylinders and adheres to the textile upon cooling. The reticulated layer of such textile when laid over another textile or fabric, upon application of ironing heat to the surface of the top textile becomes soft and tends to spread out while at the same time penetrating and clinching a corresponding geometric area on the receiving textile as the geometric figure from the reticulated layer thus forming a union or joint therewith. It is to be noted that the surface of the applique textile may be a decoration of any kind and remains smooth after application on to a receiving textile.

The method and products formed according to the invention herein are economical in saving large amounts of cementitious material. Furthermore, heretofore the adhesive or cementitious material was applied in solution thus requiring inflammable solvents and involving extra expense.

The present invention is extensively used with respect to the garment industry where wearing apparels are decorated or tapes or tags are quickly applied without requiring sewing.

While one preferred embodiment has been described in connection with the accompanying drawing, it is to be noted that various modifications as to form, arrangement of parts, materials or use thereof may be made without departing from the spirit and scope of the invention as defined in the accompanying claims.

I claim:

1. An article of manufacture for union with textile material and the like, comprising a base material containing a plurality of cementitious streaks of thermo-fusible composition containing a vinyl resin disposed in spaced apart relation forming bounded free areas therebetween and exposing parts of the said surface of the base, said composition upon the use of heat and pressure being adapted to penetrate and spread onto and thru a receptive textile material to form an integral part thereof.

2. The process of continuously applying a layer of reticulated fusible composition having vinyl resins and chlorinated rubber onto textile material which consists in continuously subjecting the textile to the action of resilient pressure and continuous movement, and simultaneously applying over one surface of the continuously moving textile a layer of fusible cementitious composition having a plurality of unencumbered areas with a geometric outline while in a plastic condition, and finally permitting said layer to cool.

3. The process of applying a fusible cementitious material on textile fabrics and the like, consisting of spreading said textile, while simultaneously applying a layer of reticulated cementitious material containing vinyl acetate resin base, onto one face of the textile with the simultaneous application of heat and pressure, and finally permitting the layer to cool whereby a flexibly rigid adhesive layer is obtained.

4. As an article of manufacture a textile fabric provided with a flexibly rigid cementitious material of geometric reticulations, said material consisting of a vinyl acetate resin, a plasticizer and a chlorinated rubber product.

5. An article of manufacture for wearing apparel, comprising a receptive base of textile and like material, and a bonding filamented thermoplastic vinyl resin material of geometric formation superficially adhered onto the receptive base, adapted to unite the base with a textile and like material whereby to join the same, said material being flexibly rigid at ordinary temperatures.

6. The process of applying a fusible thermoplastic composition on to a fabric base, which comprises subjecting the fabric to the action of resilient pressure while simultaneously applying a layer of hot, geometrically filamented material containing vinyl resins onto one face of the fabric whereby said layer adheres to said face, drawing said fabric with the layer thereon to prevent indentation of the fabric and finally permitting the layer of material to cool thereon.

CHARLES EMMEY.